3,326,293
WELL CASING REPAIR
Uvon Skipper, Houston, Tex., assignor to Wilson Supply Company, Houston, Tex., a corporation of Texas
Filed June 29, 1964, Ser. No. 378,841
21 Claims. (Cl. 166—150)

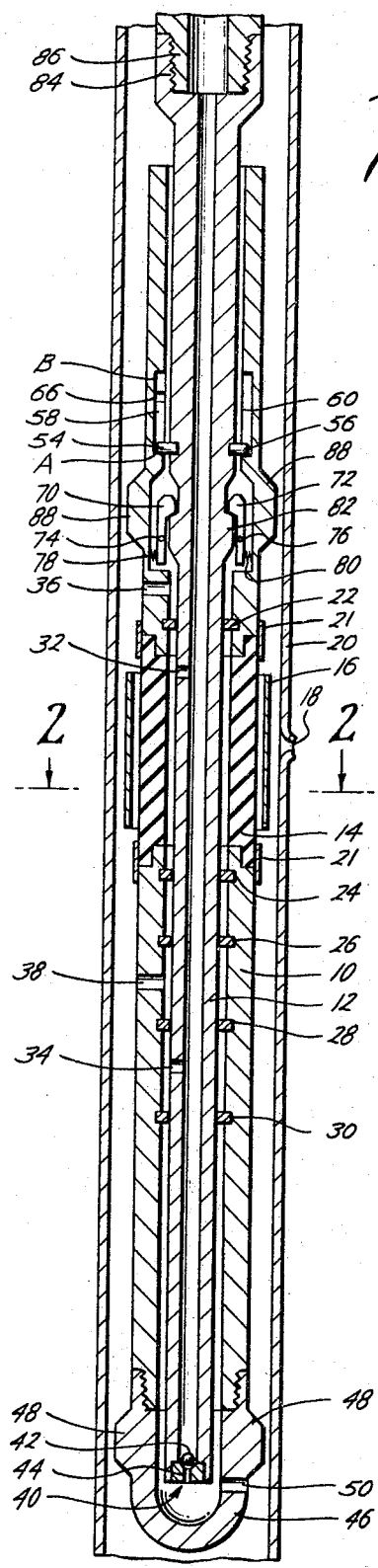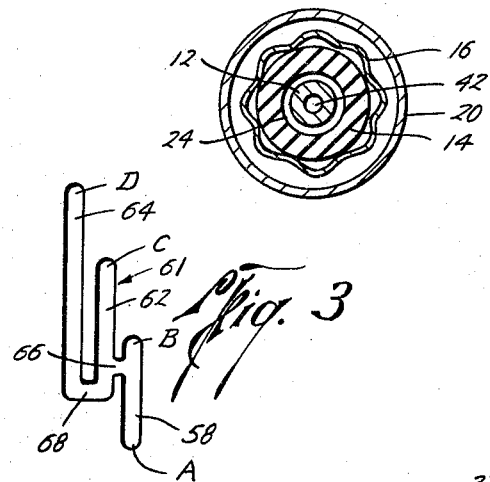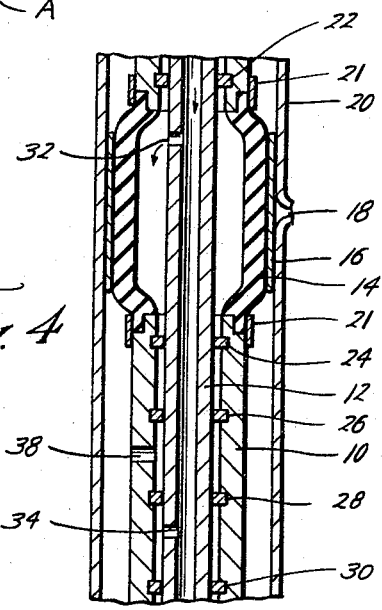

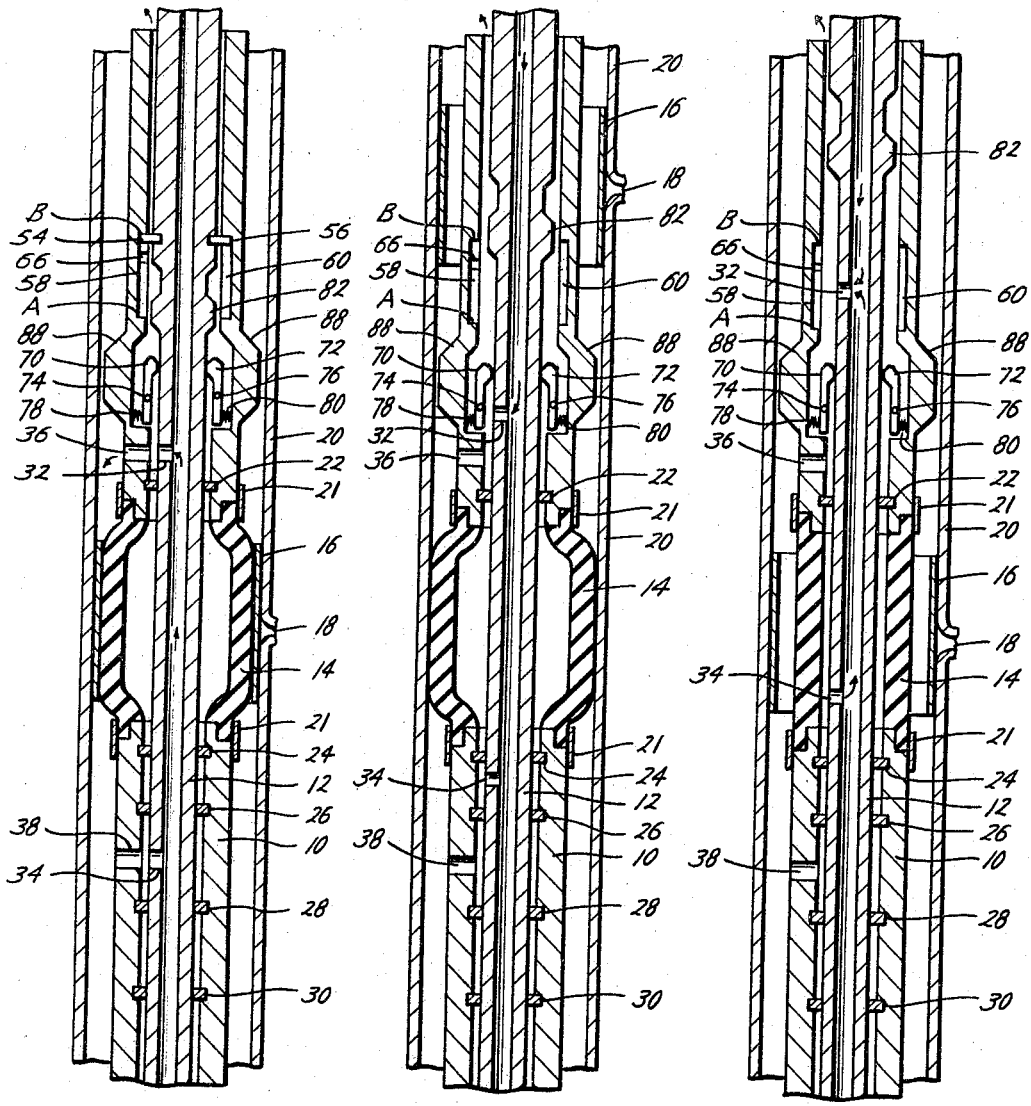

The invention concerns a tool suitable for insertion into a casing, such as a well casing, for locating and/or repairing certain types of damage in the casing, and it additionally concerns a method by which a casing can be patched and the quality of the patch can be tested without withdrawal from the casing.

Well casings, underground pipes, and pressure vessels in general sometimes develops holes, ruptures, or other discontinuities which need to be repaired. The holes or ruptures can result from a number of causes, such as corrosion, unusual stresses, abrasive action, operation of equipment within the vessel, intentional fracturing, and the like, and the damaged area is usually not readily accessible, rendering repair difficult.

A number of tools for locating the damaged area and for repairing the damaged area have been proposed. For example, to locate the damaged area, one may employ an electromagnetic inspection tool, a tool having mechanical fingers for locating damage, a tool which obtains an impression of the damaged area in wax, rubber, or the like, or a tool which permits pressurization of the casing in successive portions to determine at what point leakage occurs.

In general, after the damage is located, repair is effected by setting a liner in the casing over the damaged area. The liner is ordinarily radially expansible to permit both insertion in the casing and setting against the inner wall of the casing, and can comprise such expansible materials as ductile metals or plastics, glass fabrics impregnated with a setting resin, or brittle materials such as steel when the brittle materials are corrugated or otherwise shaped to permit expansion. A liner comprising corrugated steel covered with glass fabric and a setting resin has been found to be particularly effective for repairing damage when the liner must withstand high pressures and stresses, such as in well casings. Tools for setting a liner generally comprise, depending on the type of liner, of course, either a means for longitudinally compressing at least a portion of the liner to expand the liner radially and set it against the casing, resilient means for radially expanding against the liner to expand and set the liner, or a solid cone-shaped expander which is drawn through the liner to expand it radially.

The invention provides a novel tool which can be employed not only to set a radially expansible liner in a casing or other object but also to locate a damaged area in a casing or other object, and which can exhibit a variety of desirable characteristics as will be pointed out hereinafter. The invention also provides a novel method which can reduce the amount of work involved in repairing a damaged area in a casing or other object.

In the drawings:

FIG. 1 is a sectional view of of a tool in accordance with the invention positioned in a well casing with a liner disposed adjacent a damaged area of the casing;

FIG. 2 is a sectional view taken along the line 2—2 in FIG. 1;

FIG. 3 is a schematic illustration of a guide slot employed in the embodiment of the invention shown in FIG. 1;

FIG. 4 is a sectional view of the central portion of the tool of FIG. 1 illustrating one operating position of the tool;

FIG. 5 is a sectional view illustrating more of the portion of the tool of FIG. 1 in a second operating position;

FIG. 6 is a sectional view of a central portion of the tool of FIG. 1 illustrating a third operating position of the tool; and FIG. 7 is a sectional view of a central portion of the tool of FIG. 1 illustrating a fourth operating position of the tool.

For purposes of clarity, the presence of fluid is not illlustrated in the drawings, although its flow is indicated.

In general, a tool exemplifying one embodiment of the invention, which is suitable for insertion into an object and then expansion against or toward its interior by fluid pressure, comprises an outer sleeve having a radially expansible resilient portion between its ends, an inner sleeve slidable in the outer sleeve to two positions, and transverse conduit means and sealing means associated with the inner and outer sleeves in a number and in places sufficient for permitting in one of the two positions fluid from within the inner sleeve to flow through a conduit means to the interior or inside of the resilient portion and expand this portion, and for permitting in the other of the two positions fluid near or against the resilient portion to flow back into the inner sleeve to deflate the resilient portion and fluid in the inner sleeve to flow therefrom to the outside of the tool. The transverse conduit means and sealing means together constitute what in general may be referred to simply as conduit means for permitting the above fluid flows in the two positions.

Thus, when the tool is attached to a string of pipe and then inserted into a casing, the resilient portion of the tool can be expanded or inflated by injection of fluid under pressure through the string of pipe into the inner sleeve, and deflation can be accomplished by adjusting by manipulation of the string of pipe the relative position of the inner and outer sleeve, whereby fluid near the resilient portion and in the inner sleeve can flow to the outside of the tool. In the latter position, fluid in the string of pipe and in the inner sleeve can be displaced out into the casing, thereby keeping fluid away from an operator of the tool at the open end of the casing as the tool and string of pipe are withdrawn.

The above tool can be easily modified to gain a number of additional characteristics which are desirable especially with respect to the repair of casings in oil or gas wells. For example, sufficient conduit means and sealing means may be added to permit pressurization of the casing at one end of the tool by fluid flowing out of the inner sleeve when the resilient portion is expanded, thereby permitting a determination of leakage through the casing above or below the tool. Conduit means and sealing means may also be located to permit equalization of pressures in the casing above and below the tool when the resilient portion of the tool is expanded. This characteristic is desirable, for example, when the flow and pressure of oil or gas within a casing are strong enough to interfere with the setting of a liner in the casing.

In general, the method of the invention for patching a hole in a casing and then testing the quality of the patch comprises placing an expansible patch or liner around a radially expansible resilient portion of a tool having means for permitting fluid pressure to expand the resilient portion, attaching the tool to a pipe string and inserting the tool in the casing to a place where the patch is substantially centered over the hole, and then injecting fluid into the tool to inflate the resilient portion and thereby expand and set the patch against the casing over the hole. After the patch is set, the method comprises decreasing the fluid pressure on the resilient portion to deflate this portion, moving the tool to a position away from but near the patch, such as, for example, immediately below the patch in a well casing, injecting fluid into the tool to inflate the resilient portion against the casing wall, injecting fluid into the section of casing containing the patch, and determining whether leakage occurs. The patching operation can then be completed by decreasing the fluid pressure on the resilient portion of the tool to deflate this portion and then withdrawing the tool from the casing. Thus, in accordance with this method, a casing can be patched and the quality of the patch can be tested during the same trip into the casing.

The invention will be better understood by reference to the drawing wherein FIG. 1 is a vertical sectional view illustrating a preferred embodiment of a tool in accordance with the invention. The tool there shown comprises an outer sleeve 10 and an inner sleeve 12 slidable in the outer sleeve 10. The outer sleeve 10 has a radialy expansible resilient portion 14 between its ends around which is disposed a liner 16 for patching a discontinuity such as a hole 18 in a well casing 20. The outer sleeve 10 comprises two nonexpansible sections and a section of a resilient material, the resilient portion 14, mounted hermetically between and with the two nonexpansible sections. The resilient material may be any suitable material, such as natural or synthetic rubber, neoprene, and the like, and can be reinforced, if necessary, with cord, braided wire, or other material to withstand the pressure required to complete the patching operation. Further, the resilient portion 14 may comprise a plurality of layers of resilient material with a reinforcing material such as wire between adjacent layers. The resilient material may be connected to the nonexpansible sections in any suitable manner, such as with bonding agents, mechanical means such as metal bands 21, or a combination of the two. The inner sleeve 12 and the nonexpansible sections of the outer sleeve 10 are preferably made of steel, but obviously may be constructed of other suitable materials.

Near the ends of the resilient portion 14 and between the inner sleeve 12 and the outer sleeve 10 are sealing or packing means 22 and 24, such as an O-ring or other annular packing member made of, for example, neoprene, natural or synthetic rubber, or other suitable packing material. Sealing means 26, 28, and 30 which can be similar in construction to the sealing means 22 and 24 are spaced in order below the sealing means 24 and between the inner sleeve 12 and the outer sleeve 10. All of the sealing means can be held in place by retaining grooves in the inside wall of the outer sleeve 10 as shown, or by other suitable retaining means.

A pair of transverse ports or apertures 32 and 34 are longitudinally spaced in the inner sleeve 12, and a pair of transverse ports or apertures 36 and 38 in the outer sleeve 10 are spaced longitudinally about the same distance apart as the ports 32 and 34. At the bottom end of the inner sleeve 12 is a means 40 for closing this end when the inner sleeve 12 contains fluid under pressure, which means may be a permanently closed portion of the inner sleeve 12, but which preferably is a check valve comprising a ball 42 resting on a seat 44. A check valve at this point permits fluid in the casing 20 to enter into the inner sleeve 12 and then flow out the top of the tool as the tool is lowered in the casing 20 when it is full of fluid, thereby permitting easy descent or entry into the casing 20.

Connected to the bottom end of the outer sleeve 10 is preferably a plug 46 which protects the remaining portions of the tool from injury during entry into the casing 20 and which has centralizing means 48 to help center the tool in the casing 20. The centralizing means 48 preferably comprises a plurality of fins having frangible portions which will break if the tool sticks in the casing 20, such as when the liner 16 is only partially expanded but yet firmly fixed against the casing 20. The centralizing means 48 may be located on the outer sleeve 10, but is preferably located on an easily replaceable part, such as the plug 46, in case of breakage. An aperture 50 is preferably provided in the plug 46 to permit fluid in the casing 20 to reach the means 40 for closing the inner sleeve 12 during descent of the tool.

As better shown in FIG. 2, the liner 16 is preferably a corrugated steel tube which is expansible to set against the casing 20, particularly when the liner 16 must withstand high pressures and stresses. The outside surface of the liner 16 is preferably coated with glass fabric and a setting resin to help effect a good seal with the casing 20, and the outside surface of the liner 16 preferably has a perimeter equal to or slightly greater than the internal circumference of the casing 20 to ensure a tight fit.

The preferred tool also comprises a means for positioning or locating the inner sleeve 12 relative to the outer sleeve 10. Such means may take the form of a pin or member extending from one of the sleeves 10 and 12 and slidable in one or more slots in the wall of the other of the sleeves 10 and 12 or possibly take the form of a worm-and-rack arrangement. The means preferably comprises a pair of pins 54 and 56 which protrude from sleeve 12 and are slidably disposed in opposed slots 58 and 60 in the interior wall of the outer sleeve 10. The pins 54 and 56 can be an integral part of the inner sleeve 12, although separate pins permit easier assembly of the tool.

As shown schematically in FIG. 3, the slots 58 and 60 preferably form a part of identical slot tracks, only one of which, track 61, is illustrated in FIG. 3. The slot tracks may assume a variety of configurations depending on the number of relative positions between the inner sleeve 12 and the outer sleeve 10 which may be desired. The slot track 61 as shown preferably comprises the slot 58 disposed longitudinally, a second longitudinal slot 62, a third longitudinal slot 64, and two interconnecting slots 66 and 68, slot 66 being shown in FIG. 1. Thus, the slot track 61 has four positions A, B, C, and D to which the pin 54 can slide, and the inner sleeve 12 can assume corresponding positions A, B, C, and D relative to the outer sleeve 10. The slot 60 in FIG. 1 is associated with an identical but oppositely disposed slot track.

Detents 70 and 72 pivotally mounted on the outer sleeve 10 by pins 74 and 76 are spring-biased against the inner sleeve 12 by tension springs 78 and 80, and engage a collet or shoulder 82 on the inner sleeve 12 to keep the pins 54 and 56 and the inner sleeve 12 in position A until detents 70 and 72 are forcibly disengaged. Obviously, only one tedent is required to accomplish the intended purpose, but one or more pairs of detents are preferred to maintain alignment of the sleeves 10 and 12. The detents 70 and 72 and the collet 82 are preferably shaped to require more force to disengage them than to engage them.

At the top end of the inner sleeve 12 is a means 84 for attaching the inner sleeve 12 to a pipe 86, preferably threads mateable with threads on the pipe 86. Also near the top end of the tool may be located a centralizing means 88 which can be constructed much the same as the centralizing means 48 near the bottom of the tool.

FIG. 1 illustrates the tool with the inner sleeve 12 positioned with respect to the outer sleeve 10 when pins 54 and 56 are in position A. This is the relative position normally maintained while the tool descends in the casing 20 and the liner 16 is centered over the hole 18. In this position the detents 70 and 72 are engaged with the collet 82 and keep the outside sleeve 10 from changing position with respect to the inner sleeve 12. When the tool is located properly in the casing 20, fluid under pressure, preferably water or a drilling mud, is injected into the open end of pipe 86 or its extension from which it flows into the inner sleeve 12, closing the check valve at the bottom end of the inner sleeve 12 and flowing into the interior of the resilient portion 14 through port 32. As particularly illustrated in FIG. 4, wherein arrows represent the direction of flow, the resilient portion 14 consequently expands out towards the casing 20 and sets the liner 16 against the casing 20. Flow through the port 34 is prevented or checked during this period by the pair of sealing means 28 and 30.

If pressures in the casing 20 above and below the expanded resilient portion 14 need to be equalized at this time, the inner sleeve 12 is moved relative to the outer sleeve 10 to position B, as shown in FIG. 5, by raising the pipe 86 or its extension the required distance and forcibly overriding the action of the detents 70 and 72 against the collet 82. The outer sleeve 10 does not move because of friction between the expanded resilient portion 14, the liner 16, and the casing 20. In this position, the port 32 passes above the sealing means 22 and communicates with the aperture 36 in the outer sleeve 10 as well as any space open to the outside of the tool between the inner sleeve 12 and the outer sleeve 10, and the port 34 falls between the sealing means 26 and 28 and communicates with the aperture 38 in the outer sleeve 10. Thus, the resilient portion 14 remains expanded, and pressures in the casing 20 above and below the resilient portion 14 can equalize by flow in either direction along the path indicated by the arrows.

When the liner 16 is permanently set in the casing 20 and the effectiveness of the liner 16 is to be tested, the pipe 86 is lowered causing the inner sleeve 12 to return to position A and to be latched in this position by detents 70 and 72 and collet 82, the position shown in FIG. 1. The pressure of the fluid in the pipe 86 and the inner sleeve 12 is then decreased to deflate the resilient portion 14, and the tool without the liner 16 is moved to a position in the casing 20 below the liner 16, as shown in FIG. 6, where the resilient portion 14 is again inflated according to the procedures described in the discussion about position A shown in FIGS. 1 and 4. The inner sleeve 12 is then moved to position C relative to outer sleeve 10 by raising the pipe 86 and overriding the detents 70 and 72, rotating the pipe 86 to move the pin 54 through the interconnecting slot 66 and the pin 56 through its corresponidng slot, and then raising the pipe 86 until the pins 54 and 56 and the inner sleeve 12 are in position C. In this position, as shown in FIG. 6 wherein the arrows indicate the direction of fluid flow, the port 34 is between a pair of sealing means 24 and 26 and thus blocked, and the port 32 is in a position where fluid introduced into the inner sleeve 12 by way of the pipe 86 will flow out of the tool through aperture 36 and the open space between the upper ends of the inner sleeve 12 and the outer sleeve 10, and pressurize the section of the casing 20 containing the liner 16 as a patch, thereby allowing a determination of any leakage past the liner 16.

To remove the tool from the casing 20 while emptying the fluid contents of the pipe 86 and the inner sleeve 12, the pins 54 and 56 are manipulated through their corresponding slot tracks to position D by manipulation of the pipe 86 while the resilient portion 14 is expanded. As shown in FIG. 7, in position D the port 34 communicates with the interior of the resilient portion 14 and the port 32 communicates with the outside of the tool through the aperture 36 and the open space between the inner sleeve 12 and the outer sleeve 10. As shown by the arrows in FIG. 7, fluid adjacent the resilient portion flows into the inner sleeve 12 to deflate the resilient portion 14, and fluid in the inner sleeve 12, including fluid entering the inner sleeve 12 from the pipe 86 as the tool is raised, flows to the outside of the tool.

Thus, a preferred embodiment of the tool of the invention permits one to patch a casing and test the quality of the patch during the same trip into a casing. The tool also is capable of emptying its fluid contents to its outside during removal of the tool from the casing, thereby avoiding troublesome conditions near the operator removing the tool from the casing.

The tool can also be employed in accordance with the above procedures to get an impression of a damaged area in a casing by having an impressionable material on the outside of the resilient portion, and then expanding the resilient portion against the damaged area. A sleeve of cured rubber with an outside covering of uncured rubber strapped over the resilient portion is particularly suitable to obtain an impression. Wax, metal foil, or similar material coated over the resilient portion can also be employed if conditions are such that the impressionable material will not be washed or dissolved from the resilient portion.

A damaged area in a casing can be located with a tool in accordance with the invention by inflating the tool at successive places in the casing, pressurizing the casing at one end of the tool at each of the places, and determining between which places leakage occurs by detecting pressure drop in the casing. For example, by inflating the resilient portion at intervals of one hundred and pressurizing the casing above the tool at each place, it can be determined within which interval a leak exists. By then pressurizing and testing the casing at different places along this interval the leak can be located with sufficient accuracy to permit patching. Of course, different size intervals may be chosen for testing as suits the operator of the tool.

What is claimed is:

1. A tool suitable for insertion into an object and then expansion against its interior by fluid pressure, said tool comprising an outer sleeve having a radially expansible resilient portion between its ends;

an inner sleeve slidable in said outer sleeve to two positions;

conduit means in the sleeves for permitting in one of said two positions fluid from within said inner sleeve to expand said resilient portion of said outer sleeve, and for permitting in the other of said two positions fluid near said resilient portion to flow back into said inner sleeve to deflate said resilient portion and fluid in said inner sleeve to empty to the outside of said tool; and an expansible patch disposed around said resilient portion, whereby said resilient portion on expansion can expand and set said patch.

2. A tool suitable for insertion into an object and then expansion against its interior by fluid pressure, said tool comprising an outer sleeve having a raidially expansible resilient portion between its ends;

an inner sleeve slidable in said outer sleeve to two positions;

transverse conduit means and sealing means associated with said inner and outer sleeves in a number and in places sufficient for permitting in one of said two positions fluid from within said inner sleeve to expand said resilient portion of said outer sleeve, and for permitting in the other of said two positions fluid near said resilient portion to flow back into said inner sleeve to deflate said resilient portion and fluid in said inner sleeve to empty to the outside of said tool; and an expansible patch disposed around said resilient portion, whereby said resilient portion on expansion can expand and set said patch.

3. A tool suitable for insertion into an object and then expansion against its interior by fluid pressure, said tool comprising an outer sleeve having a radially expansible resilient portion between its ends;

an inner sleeve slidable in said outer sleeve to three positions;

transverse conduit means and sealing means associated with said inner and outer sleeves in a number and in places sufficient for permitting in one of said three positions fluid from within said inner sleeve to expand said resilient portion of said outer sleeve, for permitting in another of said three positions fluid from within said sleeve to escape to one end of said tool while said resilient portion is expanded, and for permitting in the other of said three positions fluid near said resilient portion to flow back into said inner sleeve to deflate said resilient portion and fluid in said inner sleeve to empty to the outside of said tool; and an expansible patch disposed around said resilient portion, whereby said resilient portion on expansion can expand and set said patch.

4. A tool suitable for insertion into an object and then expansion against its interior by fluid pressure, said tool comprising an outer sleeve having a radially expansible resilient portion between its ends;

an inner sleeve slidable in said outer sleeve to four positions;

transverse conduit means and sealing means associated with said inner and outer sleeves in a number and in places sufficient for permitting in one of said four positions fluid from within said inner sleeve to expand said resilient portion of said outer sleeve, for permitting in another of said four positions fluid pressure at the outside of said tool at one of its ends to equalize with fluid pressure at the outside of said tool at the other end while said resilient portion is expanded, for permitting in another of said four positions fluid from within said sleeve to escape to only one end of said tool while said resilient portion is expanded, and for permitting in the other of said four positions fluid near said resilient portion to flow back into said inner sleeve to deflate said resilient portion and fluid in said inner sleeve to empty to the outside of said tool; and an expansible patch disposed around said resilient portion, whereby said resilient portion on expansion can expand and set said patch.

5. A tool suitable for insertion into an object and then expansion against its interior by fluid pressure, said tool comprising an outer sleeve having a radially expansible resilient portion between its ends;

an inner sleeve slidable in said outer sleeve and having a pair of longitudinally spaced transverse ports;

sealing means located near each end of said expansible resilient portion for sealing between said inner and outer sleeves;

means for positioning said inner sleeve relative to said outer sleeve, whereby one of said transverse ports in said inner sleeve can be positioned in communication with the interior of said expansible resilient portion of said outer sleeve and fluid under pressure in said inner sleeve can flow through said one of said ports and expand said expansible resilient portion;

a pair of sealing means located between said inner and outer sleeves to prevent fluid flow through the other of said ports to the outside of said tool while said expansible resilient portion is being expanded;

said pair of longitudinally spaced ports in said inner sleeve being spaced sufficiently to permit positioning of at the same time one of said ports in communication with the interior of said expansible resilient portion and the other of said ports in communication with the outside of said tool, whereby fluid against the interior of said expansible resilient portion can flow through one of said ports back into said inner sleeve and fluid in said inner sleeve can flow through the other of said ports to the outside of said tool; and an expansible patch disposed around said resilient portion, whereby said resilient portion on expansion can expand and set said patch.

6. A tool suitable for attachment to a pipe, insertion into a casing, and expansion against said casing by fluid introduced under pressure into said pipe; said tool comprising an outer sleeve having a radially expansible resilient portion between its ends;

an inner sleeve slidable in said outer sleeve and having a pair of longitudinally spaced ports therein;

said inner sleeve having at one end means for attaching said inner sleeve to said pipe and at its other end means for closing said other end upon introduction of fluid from said pipe into said inner sleeve;

sealing means located near each end of said expansible resilient portion for sealing between said inner and outer sleeves;

means associated with said inner and outer sleeves for positioning said inner sleeve relative to said outer sleeve in a first and second position, whereby in said first position one of said ports in said inner sleeve communicates with the interior of said expansible resilient portion of said outer sleeve and fluid under pressure in said inner sleeve can flow through said one of said ports and expand said expansible resilient portion; and sealing means located between said inner and outer sleeves to prevent fluid flow through the other of said ports to the outside of said tool while in said first position;

said pair of longitudinally spaced ports being spaced sufficiently to permit while said inner sleeve is in said second position relative to said outer sleeve communication of one of said ports with the interior of said expansible resilient portion and communication of the other of said ports with the outside of said tool, whereby fluid against the interior of said expansible resilient portion can flow through one of said ports back into said inner sleeve and fluid in said sleeve can flow through the other of said ports to the outside of said tool.

7. The tool defined in claim 6 wherein said outer sleeve comprises two nonexpansible sections, and a section of a resilient material mounted hermetically between and with said nonexpansible sections.

8. The tool defined in claim 6 wherein said means for positioning said inner sleeve relative to said outer sleeve comprises a slot in one of the adjacent walls of said inner and outer sleeves, a member extending from the other of said adjacent walls which is slidable in said slot to a first and second position; and at least one detent associated with one of said inner and outer sleeves and engageable with the other of said inner and outer sleeves to hold said sleeves in one of said first and second positions until forcibly disengaged; and wherein said means for closing said other end of said inner sleeve is a check valve.

9. A tool suitable for attachment to a pipe, insertion into a casing, and expansion against said casing by fluid introduced under pressure into said pipe; said tool comprising an outer sleeve having a radially expansible resilient portion between its ends and a transverse aperture between said resilient portion and one of its ends;

an inner sleeve slidable in said outer sleeve and having a pair of longitudinally spaced ports therein;

said inner sleeve having at one end means for attaching said inner sleeve to said pipe and at its other end means for closing said other end upon introduction of fluid from said pipe into said inner sleeve;

means associated with said inner and outer sleeves for positioning said inner sleeve relative to said outer sleeve in first, second, and third positions;

sealing means located near each end of said resilient portion for sealing between said inner and outer sleeves;

said spaced ports being spaced farther apart than said sealing means located near each end of said resilient portion; and sealing means located between said inner and outer
sleeves in a number and in places sufficient to prevent
flow through one of said ports when the other of
said ports communicates with the interior of said
resilient portion in one of said positions, thereby
permitting expansion of said resilient portion by fluid
pressure, to permit communication of one of said
ports with said aperture in said outer sleeve when the
other of said ports communicates with the outside
of said tool in another of said positions, thereby permitting equalization of pressure inside said casing at
both ends of said tool when said resilient portion is
expanded, and to permit flow from the interior of
said resilient portion through one of said ports into
said inner sleeve and flow from said inner sleeve
through the other of said ports to the outside of said
tool in the other of said positions, thereby permitting
deflation of said resilient portion and emptying of
fluid from said inner sleeve.

10. The tool defined in claim 9 wherein said outer sleeve comprises
two nonexpansible sections and
a section of a resilient material mounted hermetically between and with said nonexpansible sections.

11. The tool defined in claim 9 wherein said means for positioning said inner sleeve relative to said outer sleeve comprises
a slot track in one of the adjacent walls of said inner and outer sleeves and having first, second, and third positions,
a member extending from the other of said adjacent walls which is slidable in said slot track, and
at least one detent associated with one of said inner and outer sleeves and engageable with the other of said inner and outer sleeves to hold said sleeves in one of said positions; and
wherein said means for closing said other end of said inner sleeve is a check valve.

12. A tool suitable for attachment to a pipe, insertion into a casing, and expansion against said casing by fluid introduced under pressure into said pipe; said tool comprising
an outer sleeve having a radially expansible resilient portion between its ends;
an inner sleeve slidable in said outer sleeve and having a pair of longitudinally spaced ports therein,
said inner sleeve having at one end means for attaching said inner sleeve to said pipe and at its other end means for closing said other end upon introduction of fluid from said pipe into said inner sleeve;
means associated with said inner and outer sleeves for positioning said inner sleeve relative to said outer sleeve in first, second, and third positions;
sealing means located near each end of said resilient portion for sealing between said inner and outer sleeves;
said spaced ports being spaced farther apart than said sealing means located near each end of said resilient portion; and
sealing means located between said inner and outer sleeves in a number and in places sufficient to prevent flow through one of said ports when the other of said ports communicates with the interior of said resilient portion, thereby permitting expansion of said resilient portion by fluid pressure, to prevent flow through one of said ports when the other of said ports communicates with the outside of said tool above said resilient portion in another of said positions, thereby permitting said casing at one end of said tool to be placed under fluid pressure, and to permit flow from the interior of said resilient portion through one of said ports into said inner sleeve and flow from said inner sleeve through the other of said ports to the outside of said tool in the other of said positions, thereby permitting deflation of said resilient portion and emptying of fluid from said inner sleeve.

13. The tool defined in claim 12 wherein said outer sleeve comprises
two nonexpansible sections, and
a section of a resilient material mounted hermetically between and with said nonexpansible sections.

14. The tool defined in claim 12 wherein said means for positioning said inner sleeve relative to said outer sleeve comprises
a slot track in one of the adjacent walls of said inner and outer sleeves and having first, second, and third positions,
a member extending from the other of said adjacent walls which is slidable in said slot track, and
at least one detent associated with one of said inner and outer sleeves and engageable with the other of said inner and outer sleeves to hold said sleeves in one of said positions; and
wherein said means for closing said other end of said inner sleeve is a check valve.

15. A tool suitable for attachment to a pipe, insertion into a casing, and expansion against said casing by fluid introduced under pressure into said pipe; said tool comprising
an outer sleeve having a radially expansible resilient portion between its ends and a transverse aperture between said resilient portion and one of its ends;
an inner sleeve slidable in said outer sleeve and having a pair of longitudinally spaced ports therein,
said inner sleeve having at one end means for attaching said inner sleeve to said pipe and at its other end means for closing said other end upon introduction of fluid from said pipe into said inner sleeve;
means associated with said inner and outer sleeves for positioning said inner sleeve relative to said outer sleeve in first, second, third and fourth positions;
sealing means located near each end of said resilient portion for sealing between said inner and outer sleeves;
said spaced ports being spaced farther apart than said sealing means located near each end of said resilient portion; and
sealing means located between said inner and outer sleeves in a number and in places sufficient to prevent flow through one of said ports when the other of said ports communicates with the interior of said resilient portion in one of said positions, thereby permitting expansion of said resilient portion by fluid pressure, to permit communication of one of said ports with said aperture in said outer sleeve when the other of said ports communicates with the outside of said tool in another of said positions, thereby permitting equalization of pressures inside said casing at both ends of said tool when said resilient portion is expanded, to prevent flow through one of said ports when the other of said ports communicates with the outside of said tool in another of said positions, thereby permitting said casing at one end of said tool to be placed under fluid pressure, and to permit flow from the interior of said resilient portion through one of said ports into said inner sleeve and flow from said inner sleeve through the other of said ports to the outside of said tool in the other of said positions, thereby permitting deflation of said resilient portion and emptying of fluid from said inner sleeve.

16. The tool defined in claim 15 wherein said outer sleeve comprises
two nonexpansible sections, and
a section of a resilient material mounted hermetically between and with said nonexpansible sections.

17. The tool defined in claim 15 wherein said means for positioning said inner sleeve relative to said outer sleeve comprises a slot track in one of the adjacent walls of said inner and outer sleeves and having first, second, third, and fourth positions, a member extending from the other of said adjacent walls which is slidable in said slot track, and at least one detent associated with one of said inner and outer sleeves and engageable with the other of said inner and outer sleeves to hold said sleeves in one of said positions; and wherein said means for closing said other end of said inner sleeve is a check valve.

18. A tool suitable for attachment to a pipe, insertion into a casing, and expansion against said casing by fluid introduced under pressure into said pipe; said tool comprising an outer sleeve having a radially expansible resilient portion between its ends and a pair of transverse apertures, one being located between said resilient portion and one of its ends and the other being located between said resilient portion and the other of its ends;

an inner sleeve slidable in said outer sleeve and having a pair of ports therein longitudinally spaced apart about the same distance as said apertures, said inner sleeve having at one end means for attaching said inner sleeve to said pipe and at its other end means for closing said other end upon introduction of fluid from said pipe into said inner sleeve;

means assocated with said inner and outer sleeve for positioning said inner sleeve relative to said outer sleeve in first, second, third, and fourth positions; and first, second, third, fourth, and fifth sealing means for sealing between said inner and outer sleeves;

said first sealing means being located between one of said apertures and one end of said resilient portion, said second sealing means being located near the other end of said resilient portion, said third sealing means being spaced from said second sealing means and farther away from said resilient portion, said fourth sealing means being farther spaced from said second sealing means and positioned whereby the other of said apertures is between said third and fourth sealing means, and said fifth sealing means being spaced farther from said second sealing means, whereby in one of said positions one of said ports communicates with the interior of said resilient portion when the other of said ports is between said fourth and fifth sealing means, thereby permitting fluid to expand said resilient portion;

whereby in another of said positions said ports communicate with said apertures, thereby permitting equalization of pressures in said casing at both ends of said tool when said resilient portion is expanded;

whereby in another of said positions one of said ports communicates with the outside of said tool when the other of said ports is between said second and third sealing means, thereby permitting fluid to flow from said inner sleeve to the outside of said tool to raise the pressure in said casing at one end of said tool when said resilient means is expanded; and whereby in the other of said positions one of said ports communicates with the outside of said tool when the other of said ports communicates with the interior of said resilient portion, thereby permitting deflation of said resilient portion and emptying of fluid from said inner sleeve.

19. The tool defined in claim 18 wherein said sealing means are O-rings positioned in retaining grooves in the inside wall of said outer sleeve, and said outer sleeve comprises two nonexpansible sections and a section of a resilient material mounted hermetically between and with said nonexpansible sections.

20. The tool defined in claim 18 wherein said means for positioning said inner sleeve relative to said outer sleeve comprises a slot track in one of the adjacent walls of said inner and outer sleeves and having first, second, third, and fourth positions;

a member extending from the other of said adjacent walls which is slidable in said slot track, and at least one detent associated with one of said inner and outer sleeves and engageable with the other of said inner and outer sleeves to hold said sleeves in one of said positions; and wherein said means for closing said other end of said inner sleeve is a check valve.

21. The tool defined in claim 18 wherein said means for positioning said inner sleeve relative to said outer sleeve comprises a slot track in the inside wall of said outer sleeve which comprises three longitudinal slots and two transverse slots to form first, second, third and fourth positions therein, a pin extending from the outside wall of said inner sleeve into said slot track and slidable in said slot track, a collet on said inner sleeve, and at least one spring-biased detent mounted on said outer sleeve and positioned to engage said collet and hold said inner sleeve in one of said positions until forcibly disengaged.

References Cited

UNITED STATES PATENTS

| | | | |
|---|---|---|---|
| 2,643,723 | 6/1953 | Lynes | 166—152 |
| 2,824,612 | 2/1958 | Lynes | 166—187 X |
| 2,831,542 | 4/1958 | Lynes et al. | 166—187 X |

CHARLES E. O'CONNELL, *Primary Examiner*.

JACOB L. NACKENOFF, DAVID H. BROWN, *Examiners*.